United States Patent
Sadakuni et al.

(10) Patent No.: US 7,903,394 B2
(45) Date of Patent: Mar. 8, 2011

(54) GAS-INSULATED SWITCHGEAR (75) Inventors: Hitoshi Sadakuni, Tokyo (JP); Nobuya Nakajima, Tokyo (JP); Masato Kawahigashi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 41 days.

(21) Appl. No.: 12/297,098

(22) PCT Filed: Dec. 21, 2006

(86) PCT No.: PCT/JP2006/325511
§ 371 (c)(1),
(2), (4) Date: Oct. 14, 2008

(87) PCT Pub. No.: WO2008/075436
PCT Pub. Date: Jun. 26, 2008

(65) Prior Publication Data
US 2009/0268379 A1    Oct. 29, 2009

(51) Int. Cl.
H02B 13/02 (2006.01)
H02B 1/20 (2006.01)
H01H 33/70 (2006.01)

(52) U.S. Cl. .......... 361/612; 361/618; 361/637

(58) Field of Classification Search .......... 361/612, 361/618, 637
See application file for complete search history.

(56) References Cited

U.S. PATENT DOCUMENTS

| | | | | |
|---|---|---|---|---|
| 4,503,481 | A * | 3/1985 | Fujiya et al. | 361/612 |
| 4,744,002 | A * | 5/1988 | Nakano et al. | 361/612 |
| 4,745,522 | A * | 5/1988 | Mitomo et al. | 361/612 |
| 4,821,141 | A * | 4/1989 | Torimi et al. | 361/612 |
| 4,837,662 | A * | 6/1989 | Takeuchi et al. | 361/618 |
| 4,890,193 | A * | 12/1989 | Tsubaki | 361/612 |
| 4,967,307 | A * | 10/1990 | Itou et al. | 361/618 |
| 5,045,968 | A * | 9/1991 | Suzuyama et al. | 361/618 |
| 5,177,664 | A * | 1/1993 | Tsuchiya et al. | 361/612 |
| 5,578,805 | A * | 11/1996 | Berger et al. | 218/43 |
| 5,898,565 | A * | 4/1999 | Yamauchi et al. | 361/612 |
| 5,991,148 | A | 11/1999 | Heil et al. | |
| 6,134,101 | A * | 10/2000 | Bucher et al. | 361/612 |
| 6,219,225 | B1 * | 4/2001 | Tsuzura et al. | 361/612 |

(Continued)

FOREIGN PATENT DOCUMENTS

EP    174251 A2 *    3/1986

(Continued)

OTHER PUBLICATIONS

International Search Report for corresponding application No. PCT/JP2006/325511, completed Jan. 30, 2007.

*Primary Examiner* — Anatoly Vortman

(74) *Attorney, Agent, or Firm* — Buchanan Ingersoll & Rooney PC

(57) ABSTRACT

In a gas-insulated switchgear provided with three-phase main bus bars consisting of single-phase bus bars arranged in parallel with one another and three-phase circuit breakers that are arranged in parallel with one another in a direction perpendicular to the main bus bar and each have two connecting terminals that are spaced a predetermined distance apart from each other, the main bus bars are arranged between two connecting terminals of each of the circuit breakers.

5 Claims, 7 Drawing Sheets

U.S. PATENT DOCUMENTS

| | | | |
|---|---|---|---|
| 6,515,247 B1 * | 2/2003 | Tsuzura et al. | 218/43 |
| 6,624,372 B1 * | 9/2003 | Ogawa et al. | 218/71 |
| 6,646,861 B1 * | 11/2003 | Watanabe et al. | 361/612 |
| 6,727,454 B2 * | 4/2004 | Okabe et al. | 218/43 |
| 7,391,605 B2 * | 6/2008 | Sologuren-Sanchez et al. | 361/612 |
| 7,515,398 B2 * | 4/2009 | Takao et al. | 361/612 |
| 2006/0283841 A1 * | 12/2006 | Sologuren-Sanchez et al. | 218/79 |

FOREIGN PATENT DOCUMENTS

| | | | |
|---|---|---|---|
| EP | 1724802 A2 | * | 11/2006 |
| JP | 58-222706 A | | 12/1983 |
| JP | 04-304105 A | | 10/1992 |
| JP | 06197420 A | * | 7/1994 |
| JP | 10080023 A | * | 3/1998 |
| JP | 10-229614 A | | 8/1998 |
| JP | 11-008916 A | | 1/1999 |

* cited by examiner

GAS-INSULATED SWITCHGEAR

TECHNICAL FIELD

The present invention relates to a gas-insulated switchgear installed in a substation or the like.

BACKGROUND ART

A gas-insulated switchgear, configured in such a way that a high-voltage electric conductor, a switching device, an earthing device, and the like are connected with one another and contained in a metal container in which an insulating gas, such as an SF6 gas, having high-insulation performance is enclosed, has an advantage in that the insulation performance thereof is superior to that of an air-insulated switchgear, whereby the area required for installation is reduced; therefore, in recent years, the gas-insulated switchgear has widely been adopted in an electric power station, a substation, and the like.

Figure 7:
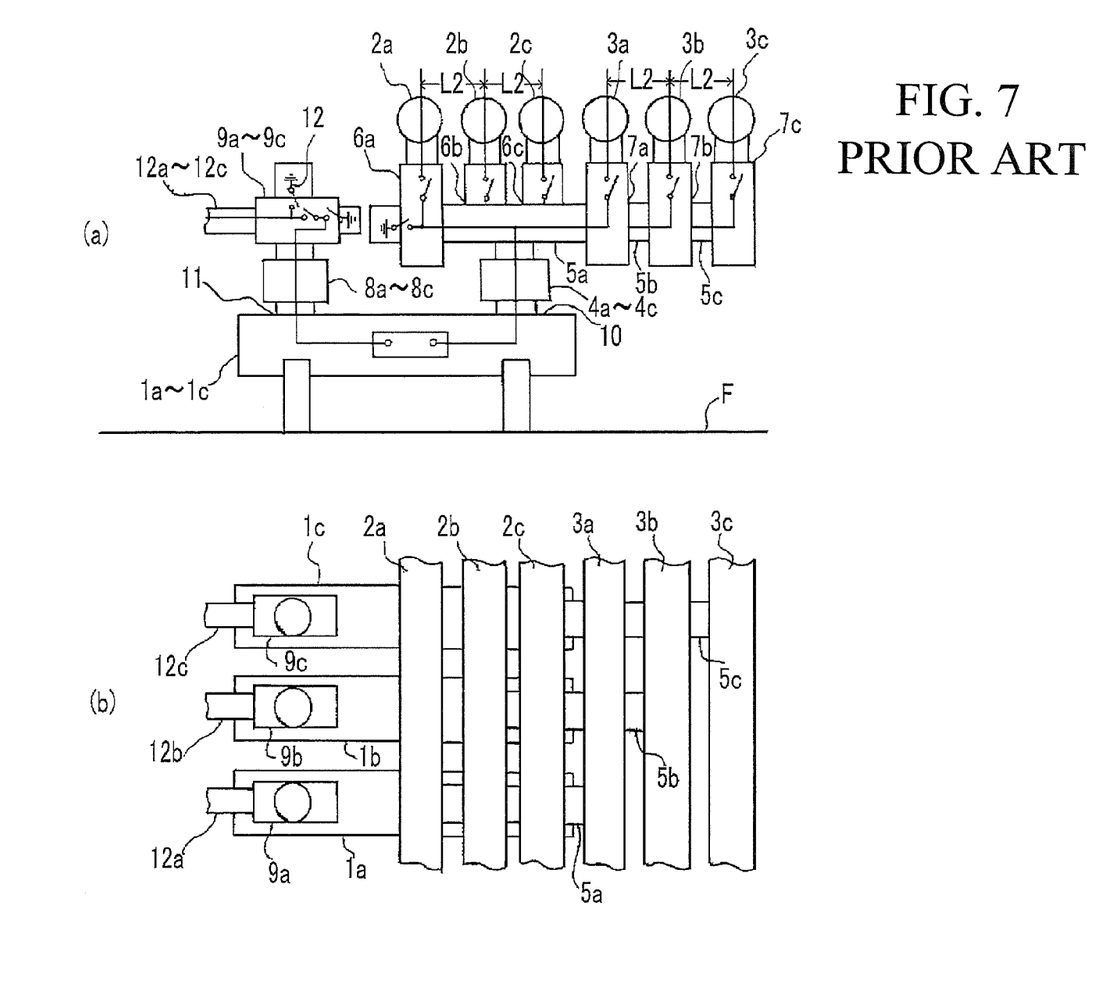
FIG. 7 is a set of views illustrating the configuration of a conventional gas-insulated switchgear.

In order to further downsize such a gas-insulated switchgear, various proposals have been implemented (refer to Patent Document 1); an example of gas-insulated switchgears disclosed in Patent Document 1 will be explained with reference to FIG. 7. FIG. 7 in which 7(a) is an elevation view and 7(b) is a plan view illustrates a gas-insulated switchgear applied to locations where double bus bars 2a to 2c and 3a to 3c that are horizontally arranged spaced an inter-phase distance L2 apart from one another are connected with transmission-line circuits 12a to 12c extending in a direction perpendicular to the double main bus bars, by way of circuit breakers 1a to 1c, disconnecting switches 6a to 6c, 7a to 7c, and 9a to 9c, and the like.

In FIG. 7(a), single-phase gas-insulated circuit breakers 1a to 1c for three phases are provided in parallel with one another in a direction perpendicular to the plane of the paper; only one single-phase gas insulated circuit breaker is illustrated in FIG. 7(a). A T-shaped connecting bus bars 5a is provided, by way of an instrument transformer 4a, at a bus-bar terminal 10 that is one of the lead exit portions of the single-phase gas-insulated circuit breaker 1a for one of the three phases; a T-shaped connecting bus bar 5b is provided, by way of an instrument transformer 4b, at a corresponding bus-bar terminal that is one of the lead exit portions of the single-phase gas-insulated circuit breaker 1b for one of the three phases; a T-shaped connecting bus bar 5c is provided, by way of an instrument transformer 4c, at a corresponding bus-bar terminal that is one of the lead exit portions of the single-phase gas-insulated circuit breaker 1c for one of the three phases; the first bus bar 2a is connected with the one end of the connecting bus bar 5a, by way of the first bus-bar disconnecting switch 6a; the first bus bar 2b is connected with the one end of the connecting bus bar 5b, by way of the first bus-bar disconnecting switch 6b; the first bus bar 2c is connected with the one end of the connecting bus bar 5c, by way of the first bus-bar disconnecting switch 6c; additionally, the second bus bar 3a is connected with the other end of the T-shaped connecting bus bar 5a, by way of the second bus-bar disconnecting switch 7a; the second bus bar 3b is connected with the other end of the T-shaped connecting bus bar 5b, by way of the second bus-bar disconnecting switch 7b; the second bus bar 3c is connected with the other end of the T-shaped connecting bus bar 5c, by way of the second bus-bar disconnecting switch 7c.

In contrast, a transmission-line disconnecting switch 9a is provided, by way of an instrument transformer 8a, at a transmission-line terminal 11 that is the other one of the lead exit portions of the single-phase gas-insulated circuit breaker 1a; a transmission-line disconnecting switch 9b is provided, by way of an instrument transformer 8b, at a corresponding transmission-line terminal that is the other one of the lead exit portions of the single-phase gas-insulated circuit breaker 1b; a transmission-line disconnecting switch 9c is provided, by way of an instrument transformer 8c, at a corresponding transmission-line terminal that is the other one of the lead exit portions of the single-phase gas-insulated circuit breaker 1c; transmission-line circuits 12a to 12c are connected with the transmission-line disconnecting switches 9a to 9c, respectively. In addition, reference numeral 12 denotes an earthing device for executing earthing through the metal container.

However, in the gas-insulated switchgear configured as described above, the first bus bars 2a to 2c and the second bus bars 3a to 3c for three phases respectively are arranged in parallel with one another and spaced a predetermined inter-phase distance L2 apart from one another so that the single-phase bus bars do not interfere with one another. However, because the circuit breakers 1a to 1c for three phases are arranged overlapped as illustrated in FIG. 7(b), the respective lengths of the connecting bus bars 5a to 5c should be adjusted so as to make connection between the bus bars, for each phase, which are arranged spaced the inter-phase distance apart from each other; therefore, the T-shaped connecting bus bars 5a to 5c having different sizes in accordance with the respective circuit breakers corresponding to the three phases should be prepared, thereby preventing downsizing and standardization.

Therefore, according to Patent Document 1, by arranging the circuit breakers for the respective phases in parallel with one another and spaced the inter-phase distance between the bus bars apart from one another, thereby utilizing T-shaped connecting bus bars, having the same shape, for the respective three phases, the downsizing of the whole configuration and the standardization of constituent components are achieved.

However, even with the foregoing method, it has been a problem that, because the circuit breakers 1a to 1c are arranged spaced the inter-phase distance between the bus bars apart from one another and the first bus bars 2a to 2c and the second bus bars 3a to 3c are arranged in parallel with one another and in a horizontal manner with respect to a mounting plane F, the bus bars have been forced to arrange in such a way as to avoid the space corresponding to both the lead exit portions of the circuit breaker, whereby the overall mounting area is still large.

[Patent Document 1]
  Japanese Laid-Open Patent Publication No. 1992-304105

DISCLOSURE OF THE INVENTION

Problem to be Solved by the Invention

The present invention, which has been implemented in consideration of the foregoing background, provides a gas-insulated switchgear with which further downsizing and standardization can readily be realized, by changing the arrangement configuration of the bus bars.

Means for Solving the Problem

The present invention is characterized in that, in a gas-insulated switchgear provided with multiphase main bus bars consisting of single-phase bus bars arranged in parallel with one another and circuit breakers that are arranged in parallel with one another in a direction perpendicular to the main bus bar and each have two lead exit portions that are spaced a predetermined distance apart from each other, the main bus bars are arranged in a space between two lead exit portions of each of the circuit breakers.

Advantage of the Invention

With a gas-insulated switchgear according to the present invention, the installation area can be reduced, by arranging the main bus bar in a space between the lead exit portions of the circuit breaker, and, by utilizing common components, the standardization can further be promoted.

BEST MODE FOR CARRYING OUT THE INVENTION

Embodiment 1

Figure 1:
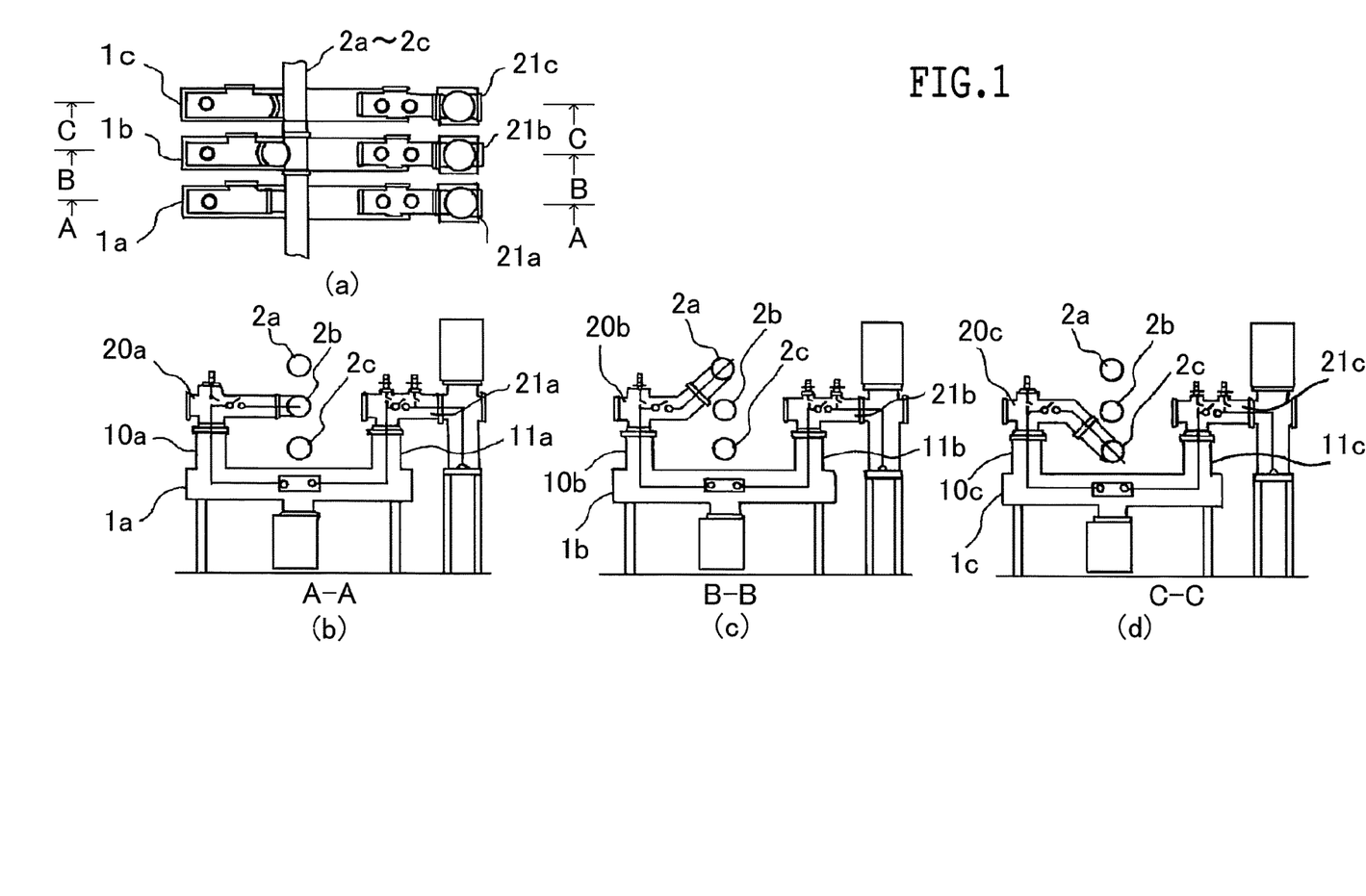
FIG. 1 is a set of views illustrating a configuration example of a gas-insulated switchgear according to Embodiment 1 of the present invention.

Embodiments of a gas-insulated switchgear according to the present invention will be explained below, with reference to the accompanying drawings. FIG. 1 is a set of views illustrating a configuration example of a gas-insulated switchgear according to Embodiment 1 of the present invention. Here, constituent elements the same as or equivalent to those in the conventional configuration example, which has been explained with reference to FIG. 7, are indicated by the same reference characters. In FIG. 1, FIG. 1(a) is a plan view; FIG. 1(b) is a cross-sectional view taken along the line A-A in FIG. 1(a); FIG. 1(c) is a cross-sectional view taken along the line B-B in FIG. 1(a); FIG. 1(d) is a cross-sectional view taken along the line C-C in FIG. 1(a). In FIG. 1, reference characters 1a to 1c denote circuit breakers; reference characters 2a to 2c denote main bus bars arranged vertically in parallel with one another; reference characters 10a, 11a, 10b, 11b, 10c and 11c denote lead exit portions, of the circuit breakers 1a to 1c, which are connecting terminals for connecting the circuit breakers 1a to 1c with external lines; the reference characters 10a, 10b, and 10c each denote a bus-bar connecting terminal that is one of the lead exit portions and the reference characters 11a, 11b, and 11c each denote a transmission-line connecting terminal that is the other one of the lead exit portions.

A coupling unit 20a in which a disconnecting switch is incorporated so as to make connection between the circuit breaker 1a and the main bus bar 2a is coupled with the bus-bar connecting terminal 10a; a coupling unit 20b in which a disconnecting switch is incorporated so as to make connection between the circuit breaker 1b and the main bus bar 2b is coupled with the bus-bar connecting terminal 10b; a coupling unit 20c in which a disconnecting switch is incorporated so as to make connection between the circuit breaker 1c and the main bus bar 2c is coupled with the bus-bar connecting terminal 10c. Because the main bus bars 2a to 2c are vertically arranged, the coupling units 20a, 20b, 20c are coupled with the main bus bars in different manners depending on the respective phases, i.e., as illustrated in FIG. 1(b), the coupling unit 20a for the first phase is coupled with the middle bus bar 2b (in the horizontal direction); as illustrated in FIG. 1(c), the coupling unit 20b for the second phase is coupled with the top bus bar 2a; and as illustrated in FIG. 1(d), the coupling unit 20c for the third phase is coupled with the bottom bus bar 2c. In contrast, in order to make connection with the external lines (unillustrated), coupling units 21a, 21b, and 21c in each of which a disconnecting switch is incorporated are coupled with the transmission-line connecting terminals 11a, 11b, and 11c, respectively.

As described above, according to the configuration example of a gas-insulated switchgear of Embodiment 1, by vertically arranging the main bus bars 2a to 2c in the middle of the space between the lead exit portions of the respective circuit breakers 1a to 1c, the gas-insulated switchgear can be downsized without making the main bus bars avoid the spaces of the lead exit portions of the circuit breakers, whereby the installation area for the gas-insulated switchgear can be reduced. Moreover, with regard to the coupling units 21a, 21b, and 21c to be coupled with the external lines, the same unit can be utilized for each phase and, among the coupling units 20a, 20b, and 20c, the units for the second and third phases can be configured in the same shape, so that the standardization of the coupling units can be enhanced.

Figure 2:
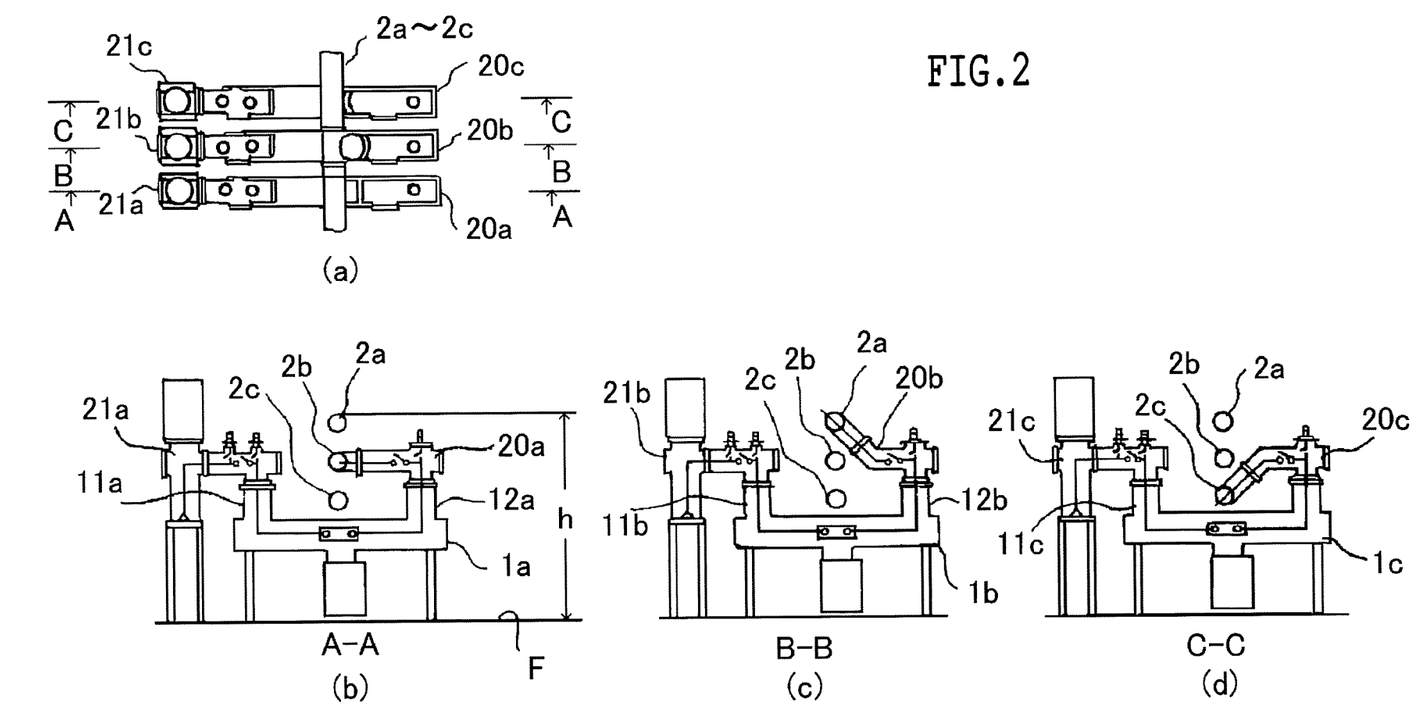
FIG. 2 is a set of views illustrating another configuration example of a gas-insulated switchgear according to Embodiment 1 of the present invention.

FIG. 2 is a set of views illustrating another configuration example of a gas-insulated switchgear according to Embodiment 1 of the present invention, i.e., an example of a case in which the transmission-line connecting terminals 11a, 11b, and 11c are situated at the sides (at the left side of each figure) opposite to those at which the transmission-line connecting terminals 11a, 11b, and 11c are situated in the case of FIG. 1. The configurations of respective units are the same as those of the respective units in FIG. 1; thus, the explanation therefor will be omitted.

As is clear from FIG. 2, by vertically arranging the main bus bars 2a to 2c in the middle of the space between the lead exit portions of the circuit breakers 1a to 1c, the main bus bars are incorporated within the space between the lead exit portions of the circuit breakers; therefore, as this example, even under such a circumstance as the installation condition on the site and the installation space is severe, e.g., in the case where the installation place of the external connection line is changed at a substation, the working can flexibly be performed, whereby the present invention is largely effective for promoting the standardization.

Embodiment 2

Figure 3:
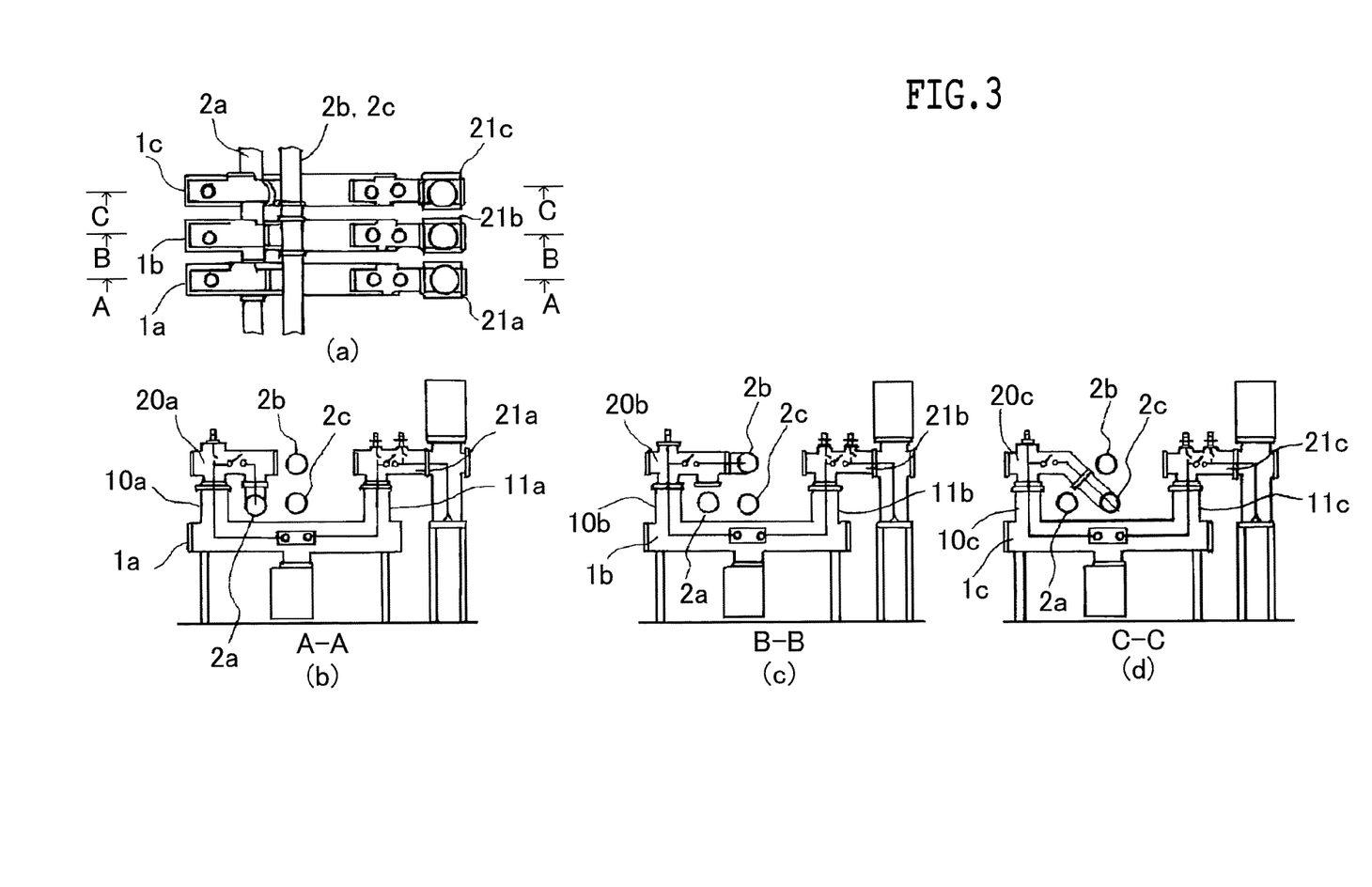
FIG. 3 is a set of views illustrating a configuration example of a gas-insulated switchgear according to Embodiment 2 of the present invention.

FIG. 3 is a set of views illustrating a configuration example of a gas-insulated switchgear according to Embodiment 2 of the present invention; the configuration is the same as that of Embodiment 1, except for the arrangement configurations of the main bus bars 2a to 2c. That is to say, in Embodiment 2, two (2b and 2c) out of the main bus bars are vertically arranged in the middle of the space between the lead exit portions of the circuit breakers 1a to 1c, and the other main bus bar 2a is arranged in such a way as to form a right isosceles triangle together with the foregoing two main bus bars.

Figure 4:
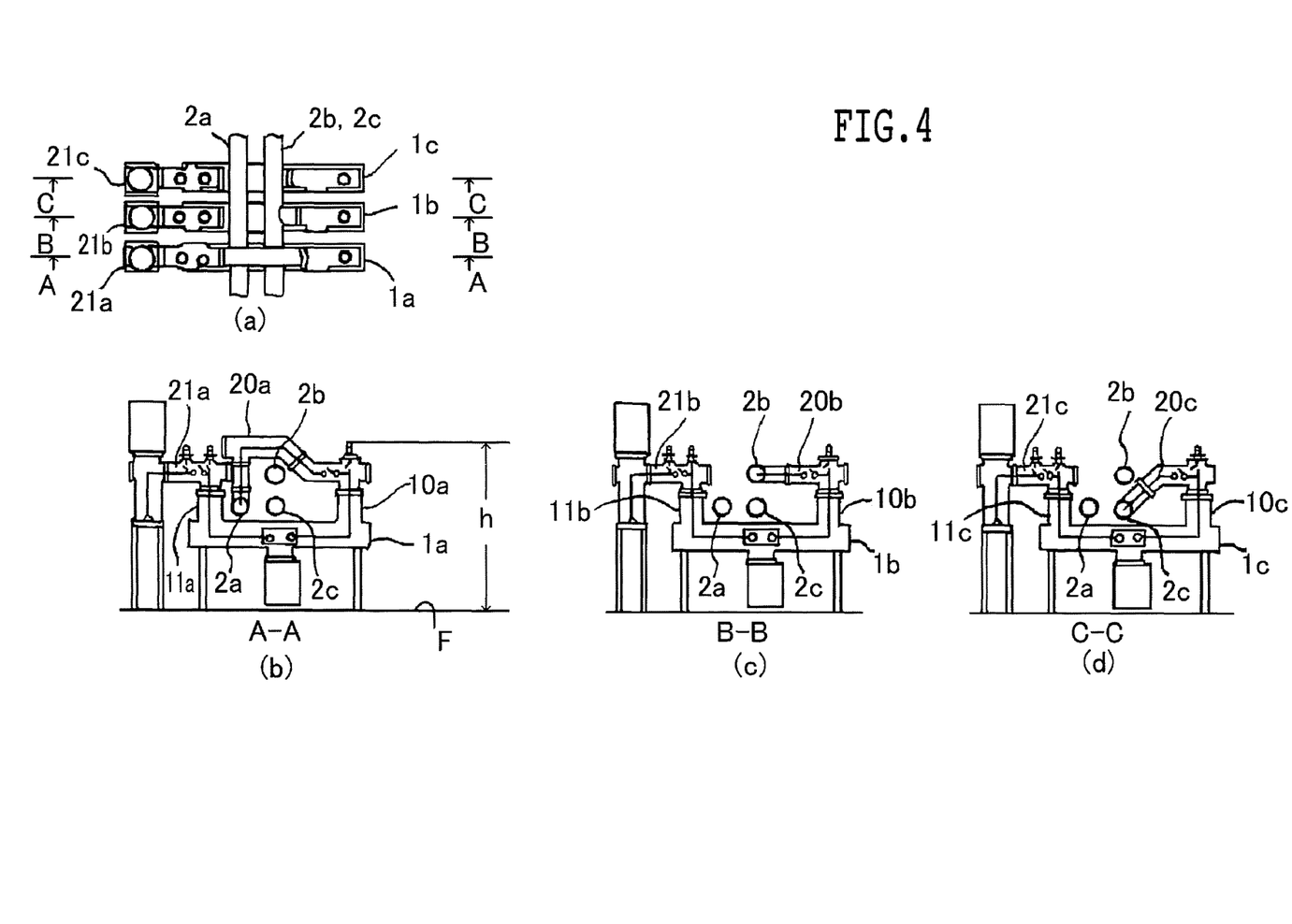
FIG. 4 is a set of views illustrating another configuration example of a gas-insulated switchgear according to Embodiment 2 of the present invention.

FIG. 4 is a set of views illustrating another configuration example of a gas-insulated switchgear according to Embodiment 2, i.e., an example of a case in which the transmission-line connecting terminals 11a, 11b, and 11c are situated at the sides (at the left side of each figure) opposite to those at which the transmission-line connecting terminals 11a, 11b, and 11c are situated in the case of FIG. 3. The configurations of the other units are the same as those of the respective units in FIG. 3; thus, the explanation therefor will be omitted.

According to Embodiment 2, the main bus bars 2a to 2c are arranged in such a way as to form a right isosceles triangle in the space between the lead exit portions of the circuit breakers 1a to 1c; therefore, the height h from the mounting plane F can be lowered compared with the gas-insulated switchgear of Embodiment 1, whereby the installation space can be diminished. Moreover, with regard to the coupling units 21a, 21b, and 21c to be coupled with the external lines, the same unit can be utilized for each phase.

Embodiment 3

Figure 5:
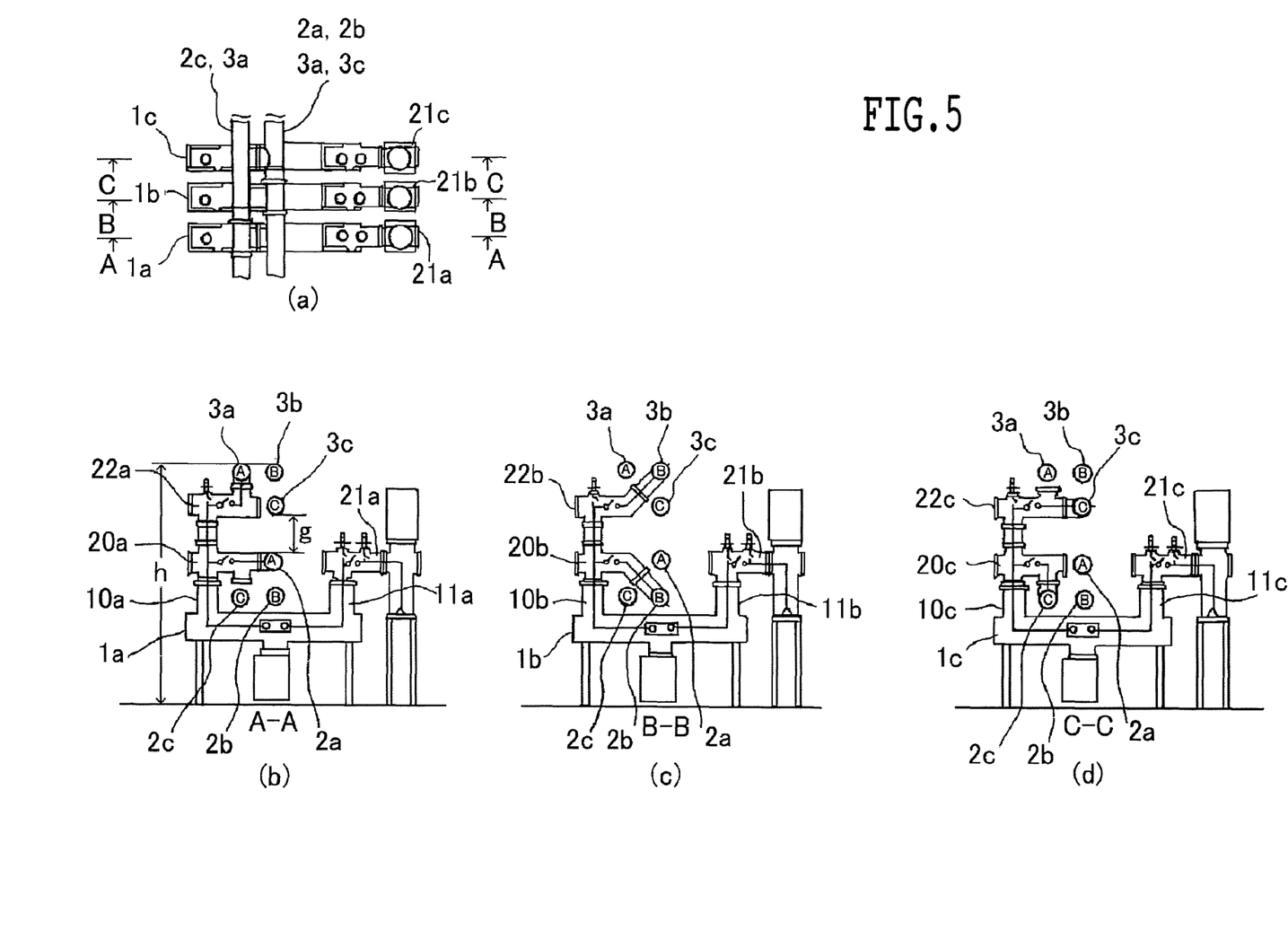
FIG. 5 is a set of views illustrating a configuration example of a gas-insulated switchgear according to Embodiment 3 of the present invention.

FIG. 5 is a set of views illustrating a configuration example of a gas-insulated switchgear according to Embodiment 3 of the present invention; an application example is illustrated in which a gas-insulated switchgear is configured with a plurality of groups of main bus bars, each group consisting of three-phase main bus bars. Embodiment 3 is characterized in that, above the main bus bars 2a to 2c of Embodiment 2, the other main bus bars 3a to 3c are arranged in a stacking manner. In other words, by way of other coupling units 22a, 22b and 22c, the other main bus bars 3a to 3c are coupled with the main bus bars 20a, 20b, and 20c, respectively, of Embodiment 2 in such a way as to form right isosceles triangles. The coupling units 22a, 22b, and 22c differ from one another in shape; the coupling units 22a, 22b, and 22c are coupled with the main bus bars 3a, 3b, and 3c, respectively.

Figure 6:
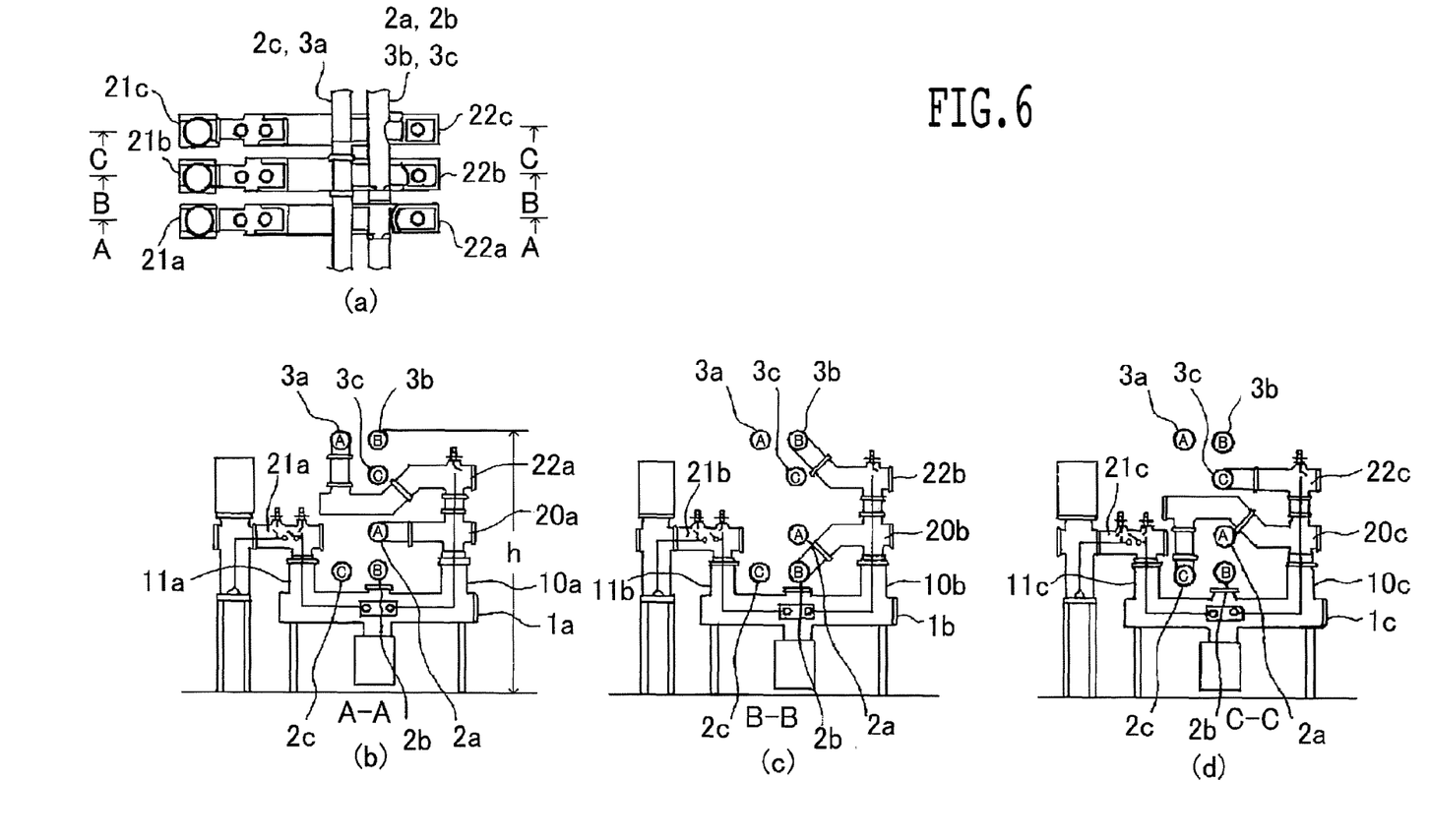
FIG. 6 is a set of views illustrating another configuration example of a gas-insulated switchgear according to Embodiment 3 of the present invention.

FIG. 6 is a set of views illustrating another configuration example of a gas-insulated switchgear according to Embodiment 3, i.e., an example of a case in which the transmission-line connecting terminals 11a, 11b, and 11c are situated at the sides (at the left side of each figure) opposite to those at which the transmission-line connecting terminals 11a, 11b, and 11c are situated in the case of FIG. 5. The configurations of the other units are the same as those of the respective units in FIG. 5; thus, the explanation therefor will be omitted.

According to Embodiment 3, the main bus bars 2a to 2c and 3a to 3c are arranged in such a way as to form right isosceles triangles in the space between the lead exit portions of the circuit breakers 1a to 1c; therefore, even though the multiphase main bus bars consisting of a plurality of groups are utilized, the main bus bars are incorporated, as is the case with Embodiments 1 and 2, within the space between the lead exit portions of the circuit breakers, whereby the installation space is further diminished; thus, the present invention can relatively flexibly be implemented in accordance with the site environment. Moreover, among the coupling units 20a, 20b, and 20c, the coupling units 21a, 21b, and 21c, and the coupling units 22a, 22b, and 22c, the units having the same shape can be utilized as it is or in a reversed manner; therefore, the standardization of components to be used can be achieved.

In addition, as illustrated in FIG. 5(b), a gap g is provided between the coupling units 20a, 20b, and 20c and the corresponding coupling units 22a, 22b, and 22c so as to ensure a clearance gap in the case where, as illustrated in FIG. 6(b), the coupling unit is reversed.

The invention claimed is:

1. A gas-insulated switchgear in which respective metal containers for multiple phases contain multiphase circuit breakers that are arranged in parallel with one another in a direction perpendicular to multiphase main bus bars arranged in parallel with one another and that are arranged overlapping one another as viewed in the axis direction of the multiphase main bus bars, wherein the multiphase main bus bars are arranged between both lead exit portions of each of the multiphase circuit breakers, the gas-insulated switchgear further comprising:
   bus-bar connecting terminals extending in a vertical direction from one end of the metal containers, respectively, and being one of the lead exit portions of the multiphase circuit breakers;
   transmission-line connecting terminals extending in a vertical direction from the other end of the metal containers, respectively, and being an other of the lead exit portions for the multiphase circuit breakers;
   first coupling units which connect the bus-bar connecting terminals to the multiphase main bus bars on a phase to phase basis; and
   second coupling units which connect the transmission-line connecting terminals to external connection lines on a phase to phase basis,
   wherein the first coupling units are configured in the same shape in at least two phases and in a different shape in a third phase, and the second coupling units are configured in the same shape in at least two phases.

2. The gas-insulated switchgear according to claim 1, wherein the main bus bars consist of three-phase main bus bars and are vertically arranged in parallel with one another in such a way as to be situated in the middle of a space between both lead exit portions of each of the circuit breakers, and wherein the second coupling units are configured in the same shape in three phases.

3. The gas-insulated switchgear according to claim 2, wherein two out of the three main bus bars are vertically arranged in the middle of a space between both lead exit portions of each of the circuit breakers and the other main bus bar is arranged in such a way as to form a right isosceles triangle together with the two main bus bars.

4. The gas-insulated switchgear according to claim 1, comprising a plurality of groups of main bus bars, the group consisting of three-phase main bus bars, wherein the plurality of groups of main bus bars are arranged between both lead exit portions of each of the multiphase circuit breakers.

5. The gas-insulated switchgear according to claim 4, wherein within each of said groups of main bus bars, two of the three main bus bars are vertically arranged in the middle of a space between both lead exit portions of each of the circuit breakers, and the other of the three main bus bars is arranged to form a right isosceles triangle together with those two main bus bars.

* * * * *